United States Patent [19]
Kamata

[11] Patent Number: 6,156,106
[45] Date of Patent: Dec. 5, 2000

[54] GAS-LIQUID SEPARATOR HAVING A CURVED COLLISION SURFACE OPPOSED TO A GAS INLET PORT

[75] Inventor: Tsutomu Kamata, Fukuoka, Japan

[73] Assignee: Kamata Tecnas Co., Ltd., Fukuoka, Japan

[21] Appl. No.: 09/242,201

[22] PCT Filed: Jun. 17, 1998

[86] PCT No.: PCT/JP98/02709

§ 371 Date: Feb. 11, 1999

§ 102(e) Date: Feb. 11, 1999

[87] PCT Pub. No.: WO99/02240

PCT Pub. Date: Jan. 21, 1999

[30] Foreign Application Priority Data

Jul. 7, 1997 [JP] Japan ................................. 9-197905

[51] Int. Cl.[7] .......................... B01D 45/08; B01D 45/16
[52] U.S. Cl. ............................ 96/189; 55/459.1; 55/462; 55/465
[58] Field of Search .................... 96/188, 189; 55/459.1, 55/459.2, 459.3, 459.4, 459.5, 462, 465, DIG. 17

[56] References Cited

U.S. PATENT DOCUMENTS

| 1,779,023 | 10/1930 | Waters | 96/446 |
| 2,037,426 | 4/1936 | McKeever | 96/188 |
| 3,246,454 | 4/1966 | Norton | 55/459.1 |
| 4,187,088 | 2/1980 | Hodgson | 55/459.4 |

FOREIGN PATENT DOCUMENTS

| 2036 606 | 7/1980 | United Kingdom | 55/459.1 |
| WO96/27423 | 9/1996 | WIPO | |

OTHER PUBLICATIONS

JP, 8-290028, A (Tsutomu Kamata), Nov. 5, 1996.
Microfilm of the specification and drawings annexed to the request of Japanese Utility Model Application No. 113020/1983 (Laid-open No. 21553/1985) (Nissan Motor Co., Ltd.), Feb. 14, 1985.
Microfilm of the specification and drawings annexed to the request of Japanese Utility Model Application No. 7398/1990 (Laid-open No. 98918/1991) (Toyokuni Kogyo K.K.), Oct. 15, 1991.

*Primary Examiner*—Duane Smith
*Assistant Examiner*—Robert A. Hopkins
*Attorney, Agent, or Firm*—Jordan and Hamburg LLP

[57] ABSTRACT

A gas-liquid separator includes a high-pressure air introducing port and an air discharging port provided respectively in lower and upper portions of a cylindrical container having a hollow chamber formed therein. A blow guide plate is provided in the cylindrical container and air supplied thereto from the high-pressure air introducing port collides therewith, thereby changing the flow direction of the air. A conical receiving plate having an opening formed at the center thereof in an upper portion of the hollow chamber is provided to partition the hollow chamber into upper and lower hollow chambers, the upper hollow chamber being partitioned by the conical receiving plate which communicates with the air discharging port. A partition having a venthole formed therein and defining the upper hollow chamber is disposed above the conical receiving plate in opposed relation, the collision surface of the blow guide plate being curved to follow an inner wall surface of the cylindrical container or inclined to widen a flow passage toward the downstream side, whereby highly efficient gas-liquid separator is achieved.

3 Claims, 13 Drawing Sheets

CHARACTERISTIC OF
MOISTURE REMOVAL RATE

GAS-LIQUID SEPARATOR HAVING A CURVED COLLISION SURFACE OPPOSED TO A GAS INLET PORT

TECHNICAL FIELD

The present invention relates to a gas-liquid separator for removing a liquid, such as moisture, contained in gas including high-pressure air.

BACKGROUND ART

As one of gas-liquid separators, there is conventionally known an air dehumidifier using a coolant such as chlorofluorocarbons. In the dehumidifier, high-pressure air is cooled by a coolant to condense water vapor in air for removing the vapor. Such an air dehumidifier has environmental problems due to the use of a coolant, for example, chlorofluorocarbons, and also requires additional devices such as a compressor or condenser for compressing the coolant and a heat exchanger for cooling the high-pressure air. Another problem is that a running cost is relatively high because a power source for operating those devices is necessary.

In another known dehumidifier, moisture in high-pressure air is removed by passing the high-pressure air through a filter provided in a dehumidifier body. This dehumidifier has a problem that if the filter becomes moist during use, moisture that has been put on the filter with the high-pressure air passing through the filter is extruded to the rear surface of the filter, causing the dehumidified high-pressure air to be moistened again. If the filter is saturated with moisture, such a problem is more serious, and the dehumidifying effect is so reduced that the filter has to be cleaned and replaced periodically.

To solve the above-mentioned problems, the inventor proposed a compressed air dehumidifier in Japanese Unexamined Patent Publication No. Hei 8-290028. The proposed dehumidifier comprises an air introducing passage and a discharging passage provided respectively to the lower and upper parts of a side surface of a cylindrical body having a hollow chamber therein, a collision surface disposed at a position in front of the introducing passage for collision of air, and a guide part for changing a flow of air that has collided with the collision surface. Further, a conical receiving plate with an opening formed at the center thereof is arranged in the hollow chamber, and a barrier plate having air holes formed therein is provided above the receiving plate.

According to the proposed dehumidifier, compressed air introduced to the hollow chamber through the introducing passage violently collides with the collision surface, whereby moisture contained in the compressed air is turned into water drops. Also, the air is changed in direction substantially at a right angle so that the air is released into the hollow chamber to follow an inner surface of the hollow chamber. The released air is separated into moisture having large specific gravity and air having small specific gravity due to centrifugal force under whirling. The separated moisture is dropped and received by a drain, and only dehumidified air is discharged through the discharging passage. Thus, the proposed dehumidifier can efficiently remove moisture in air, without using the devices conventionally employed, e.g., a compressor or the like to produce power, and an air filter which needs to be replaced.

An object of the present invention is to provide a gas-liquid separator which can achieve a higher separation effect by improving the above-discussed dehumidifier proposed in Japanese Unexamined Patent Publication No. Hei 8-290028.

DISCLOSURE OF THE INVENTION

The basic principle of the dehumidifier proposed in Japanese Unexamined Patent Publication No. Hei 8-290028 resides in violently colliding gas which contains moisture with the collision surface to turn the moisture into water drops, and whirling the gas at a high speed for centrifugal separation into gas and liquid. To enhance an operating effect of the proposed dehumidifier, therefore, it is important to whirl the introduced gas at a higher speed in the cylindrical body while minimizing energy loss during the collision of the introduced gas with the collision surface, and to prolong the time when the introduced gas remains in the cylindrical body to the extent that positive centrifugal separation in the cylindrical body is ensured.

More specifically, the present invention provides a gas-liquid separator wherein a gas inlet port is provided in the side surface of a cylindrical container having a hollow chamber formed therein, a discharging port for discharging gas after gas-liquid separation is provided at the top of the cylindrical container, a collision surface with which gas supplied from the gas inlet port collides and a guide part for changing a flow direction of the gas after collision so as to flow along an inner wall surface of the cylindrical container in a circumferential direction are provided in the cylindrical container at a position to face the gas inlet port, a receiving plate having a substantially conical shape with an opening formed at a center thereof is provided in an upper portion of the hollow chamber with a projecting central portion faced downward to divide the hollow chamber into upper and lower hollow chambers, the upper hollow chamber partitioned by the receiving plate is communicated with the discharging port, and a partition having at least one venthole and dividing the upper hollow chamber is disposed above the receiving plate in opposed relation, said collision surface being curved to follow an inner wall surface of the cylindrical container or inclined so as to widen a flow passage toward the downstream side.

The mechanism describing how upon high-pressure air, that contains a liquid, colliding with a collision surface, the liquid dispersed in gas is condensed into the form of droplets, has not yet been fully clarified. It is, however, inferred as follows. When gas containing a mist-like liquid collides with a collision surface, the gas is quickly changed in direction and then released from an outlet, whereas the liquid cannot be quickly changed in direction and flows at a slower speed than the gas so that the liquid stagnates in the vicinity of the collision surface for a moment. A succeeding mist-like liquid particle joins with a stagnating mist-like liquid particle, and as a result of repeating the above process, the mist-like liquid particles are finally turned into the form of a droplet.

Accordingly, it is required to collide gas containing a liquid with a collision surface with proper energy. In the dehumidifier proposed in Japanese Unexamined Patent Publication No. Hei 8-290028, however, since the introduced gas collides with the collision surface almost perpendicularly, energy loss caused when the flow direction of the gas is changed after collision is large, and thus whirling force for the gas cannot be sufficient. Hence, the gas-liquid separation by centrifugal force using a difference in specific gravity is limited.

In the present invention, the above problem is solved by forming a collision surface to have a curved shape following an inner wall surface of the cylindrical container, or to incline so as to widen a flow passage toward the downstream side. Here, the term "curved shape following an inner wall surface of the cylindrical containers" means such a shape as allowing the gas, which is released from the guide part to the vicinity of the inner wall surface of the cylindrical container, to flow without colliding with the wall of the cylindrical container and to whirl along the inner wall surface thereof.

In the case of inclining the collision surface, the inclination must meet both requirements of permitting the separation into gas and liquid upon collision and reducing energy loss caused when the flow direction of the gas is changed after the collision. To this end, the collision surface is inclined by 1–5°, more preferably 1–3°, with respect to the plane perpendicular to the incoming direction of the gas. If the inclination angle is too small, the energy loss would be small, but the efficiency of liquefaction, i.e., separation into gas and liquid, is reduced. Therefore, it is desired that the inclination angle be set to fall in the above range.

The operation of the gas-liquid separator thus constructed will now be described in connection with an example of removing moisture in air. When high-pressure air containing moisture is introduced from the gas inlet port under several to several tens atmospheres, the air spouts into the container at a high speed through the gas inlet port and then collides with the collision surface provided in the position to face the gas inlet port. After that, the air is changed in flow direction so as to follow the inner wall surface of the container while being guided by the guide part, and is blown into the cylindrical container from the downstream end of the guide part.

As mentioned above, as the air containing moisture violently collides against the collision surface, a succeeding mist-like water particle joins with a preceding mist-like water particle to form water drops. In addition, since a flow of the high-pressure air is changed in direction to follow the inner wall surface of the container immediately after being blown from the gas inlet port, the water drops are separated from the air under centrifugal force due to a difference in specific gravity. Moisture in air is thus separated.

The air and the moisture blown into the cylindrical container from the downstream end of the guide part rises toward the discharging port while whirling in the form of a spiral flow at a circumferential speed in accordance with the curvature of the inner circumferential surface of the cylindrical container. After rising while whirling in the form of a spiral flow, the air and the moisture are blocked by the conical receiving plate provided in the upper portion of the hollow chamber, whereupon they descend once along a lower surface of the conical receiving plate. The moisture turning into water drops then falls down into a drain provided at a bottom surface of the cylindrical container by gravity.

On the other hand, the air from which moisture has been separated gradually rises toward the central opening of the conical receiving plate while being sucked from the above, and is supplied through the hollow chamber and the discharging port to an air tool or the like connected to the discharging port. In the present invention, the partition having at least one venthole and dividing the upper hollow chamber is disposed above the receiving plate in opposed relation so that the air flowing through the central opening of the conical receiving plate does not directly flow into the discharging port. With this arrangement, the air is allowed to remain in the cylindrical container for a longer time to ensure the gas-liquid separation under centrifugal force prior to proceeding to the discharging port.

Thus, in the gas-liquid separator of the present invention, moisture having relatively large specific gravity is separated from air in the cylindrical container due to centrifugal force. The separated moisture is turned into water drops upon contacting with the inner wall surface of the cylindrical container or, in part, the lower surface of the conical receiving plate. Then, the water drops run down, and are collected and recovered by the drain provided at the bottom surface of the cylindrical container.

In addition to the above construction, it is preferable in the gas-liquid separator of the present invention that a curved member having at least one ventholes and a hemispherical inner surface should be disposed between the conical receiving plate and the partition over the central opening of the conical receiving plate to form a partitioned small chamber between the curved member and an upper surface of the receiving plate.

By providing the curved member having the hemispherical inner surface to form the small chamber, the liquid component which has not been recovered by the conical receiving plate is captured and turned into droplets by the inner surface of the curved member. These droplets fall down to the bottom surface of the cylindrical container through the central opening of the conical receiving plate, and then are recovered by the drain. The reason why the curved member is formed to have a curved inner surface is to enable the droplets contacted with the inner surface of the curved member to fall down more easily.

If the gas which is blown out from the gas-liquid separator is too much, the gas after the gas-liquid separation would be accompanied with the liquid in the cylindrical container due to a strong rush of the gas. It is, therefore, required to determine the amount of blown-out gas so as to avoid such a drawback. If only one venthole is formed in the curved member, the amount of blown-out gas can be more easily controlled.

If the venthole formed in the curved member and the venthole formed in the partition are too close to each other, the gas blown out through the venthole of the curved member would directly go through the venthole of the partition, and the gas is sometimes accompanied with the liquid as mentioned above. By arranging the venthole of the curved member and the venthole of the partition in 180° opposite positions around the center of the curved member, the venthole of each member can be maximally apart from each other, causing the gas discharged through the venthole of the curved member to temporarily remain in a space defined by the outer surface of the curved member, the lower surface of the partition and the inner surface of the cylindrical container. As a result, the liquid can be effectively prevented from blowing out together with the gas after the gas-liquid separation.

The curved member and the partition may be formed integrally or separately. In order to keep the above-mentioned positional relationship between the respective ventholes formed in the curved member and the partition, however, it is preferable that the curved member and the partition be formed integrally.

The distance between the gas inlet port and the collision surface is set to be in the range of 3–15 mm, more preferably, 5–6 mm. If the distance is too short, pressure loss would become large. Conversely, if it is too long, the resulting separation effect by collision would not be sufficient. Thus, the distance should preferably be set to fall in the above range.

Further, for the purpose of violently colliding gas with the collision surface and then changing the flow direction of the collided gas for centrifugal separation, the gas inlet port is preferably provided with a throttle portion, which comprises a nozzle mechanism or the like, for increasing a gas flow speed.

In order to minimize energy loss and to ensure a smooth flow, it is desirable that both the collision surface and the guide part provided in the cylindrical container be formed as an integral member having a continuous surface, and that an attaching/detaching mechanism to attach and detach the integral member through the gas inlet port be provided. This feature makes it possible to prevent gas leakage through a joint portion between the collision surface and the guide part, to maintain air-tightness of the cylindrical container, and to enhance the gas-liquid separation effect.

Furthermore, by defining a flow passage space surrounded by the inner wall surface of the cylindrical container, the collision surface and the guide part, and blowing out the gas which is introduced from the inlet port through an outlet (downstream end) of this flow passage space along the inner wall surface of the cylindrical container, the flow direction of the gas can be easily controlled, and also energy loss can be limited at a lower level compared with the device of releasing the gas into an open space without any barrier.

BEST MODE FOR CARRYING OUT THE INVENTION

Figure 1:
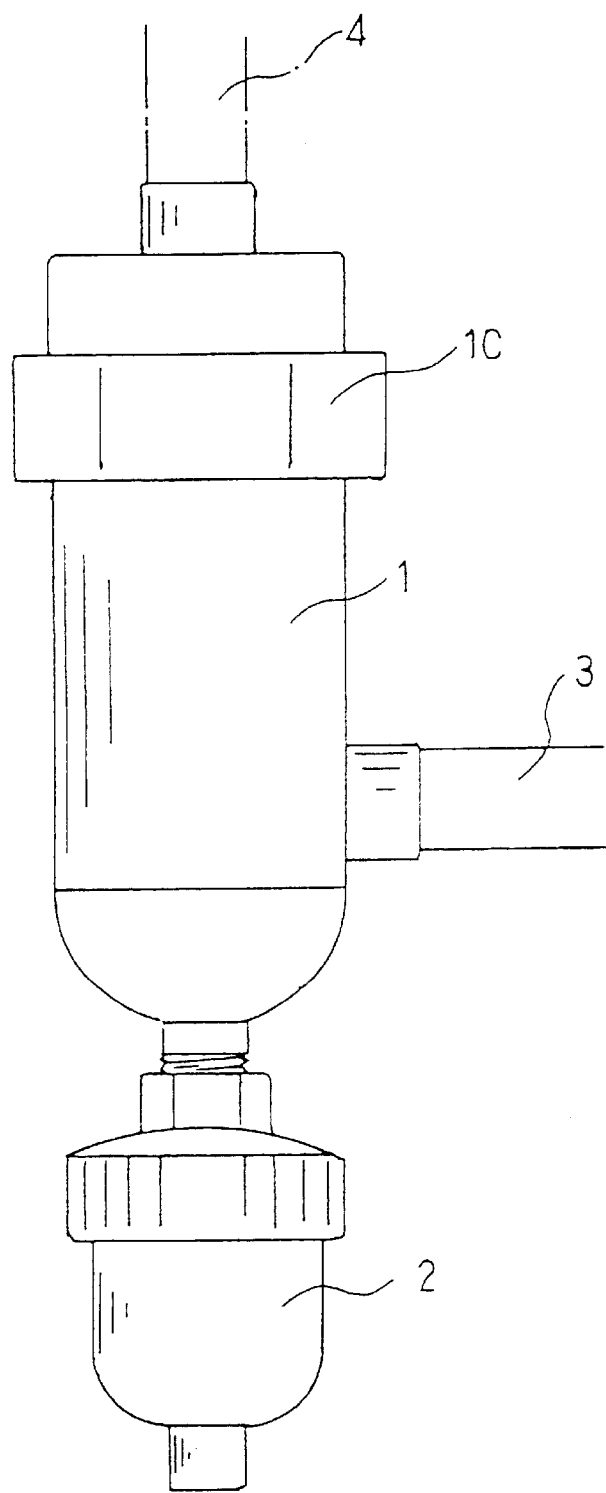
FIG. 1 is a front view of a gas-liquid separator of a first embodiment.
Figure 2:
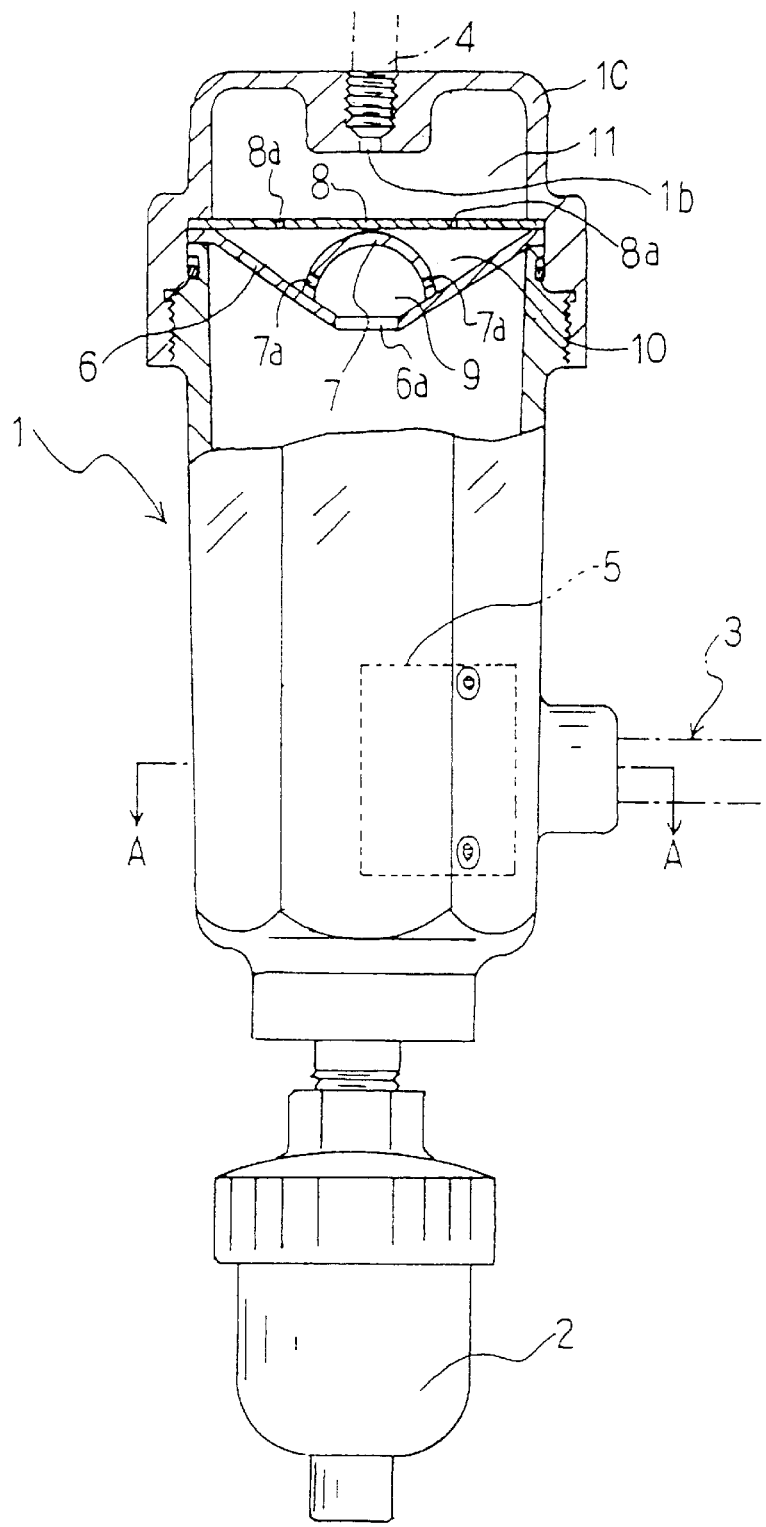
FIG. 2 is a partly vertically sectional view of the gas-liquid separator shown in FIG. 1.
Figure 3:
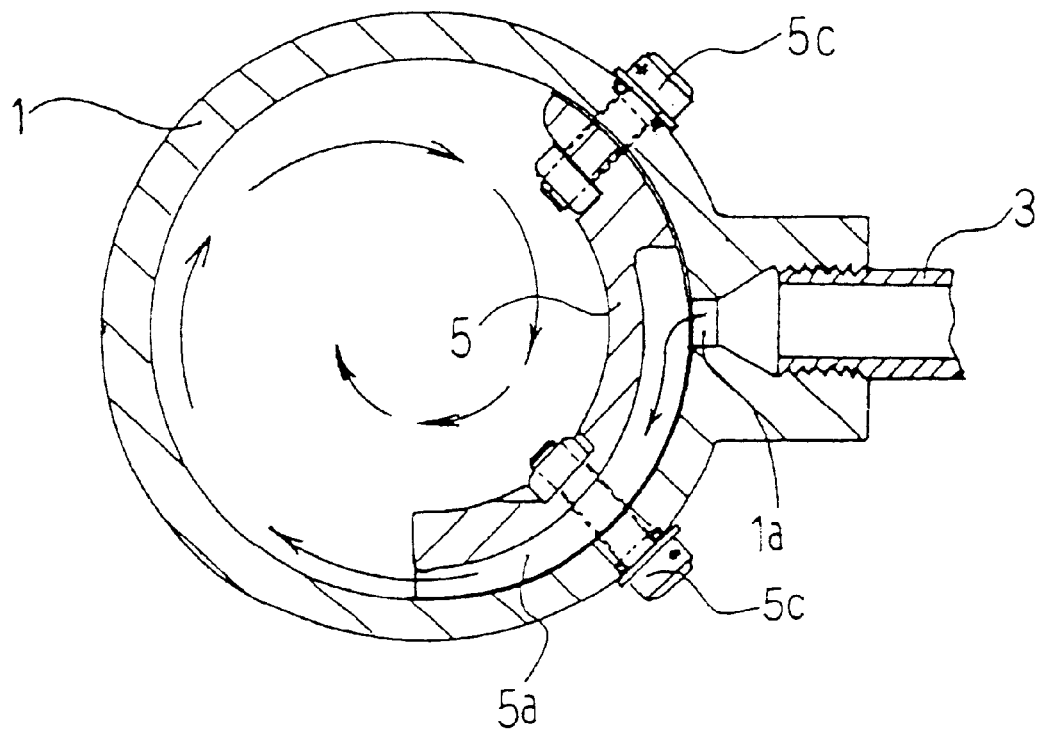
FIG. 3 is a sectional view taken along the line A—A of FIG. 2.
Figure 4:
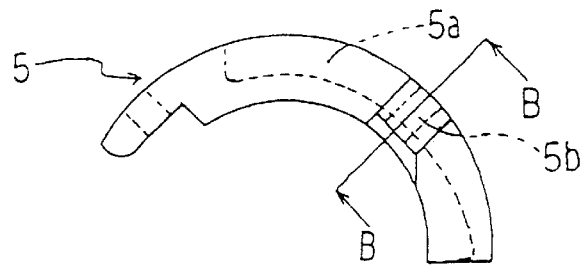
FIG. 4 is a plan view of a blow guide plate in the gas-liquid separator shown in FIG. 2.
Figure 5:
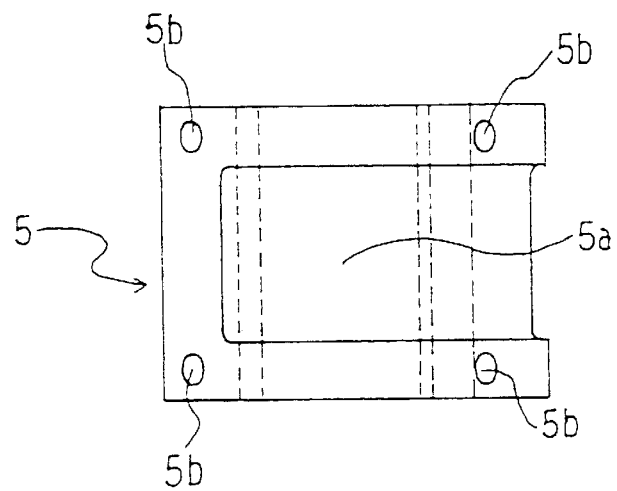
FIG. 5 is a side view of the blow guide plate shown in FIG. 4.
Figure 6:
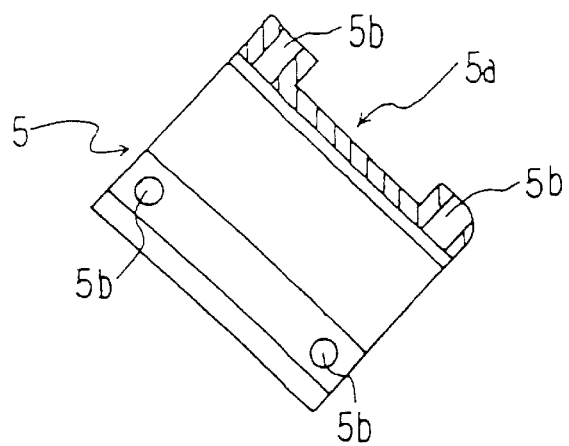
FIG. 6 is a sectional view taken along the line B—B in FIG. 4.
Figure 7:
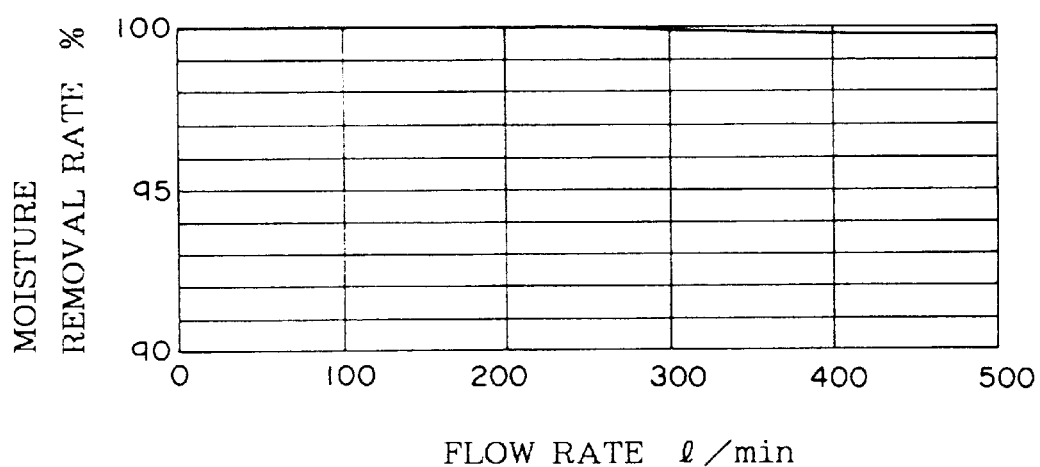
FIG. 7 is a performance graph plotting a moisture removal rate of the gas-liquid separator shown in FIG. 1.
Figure 8:
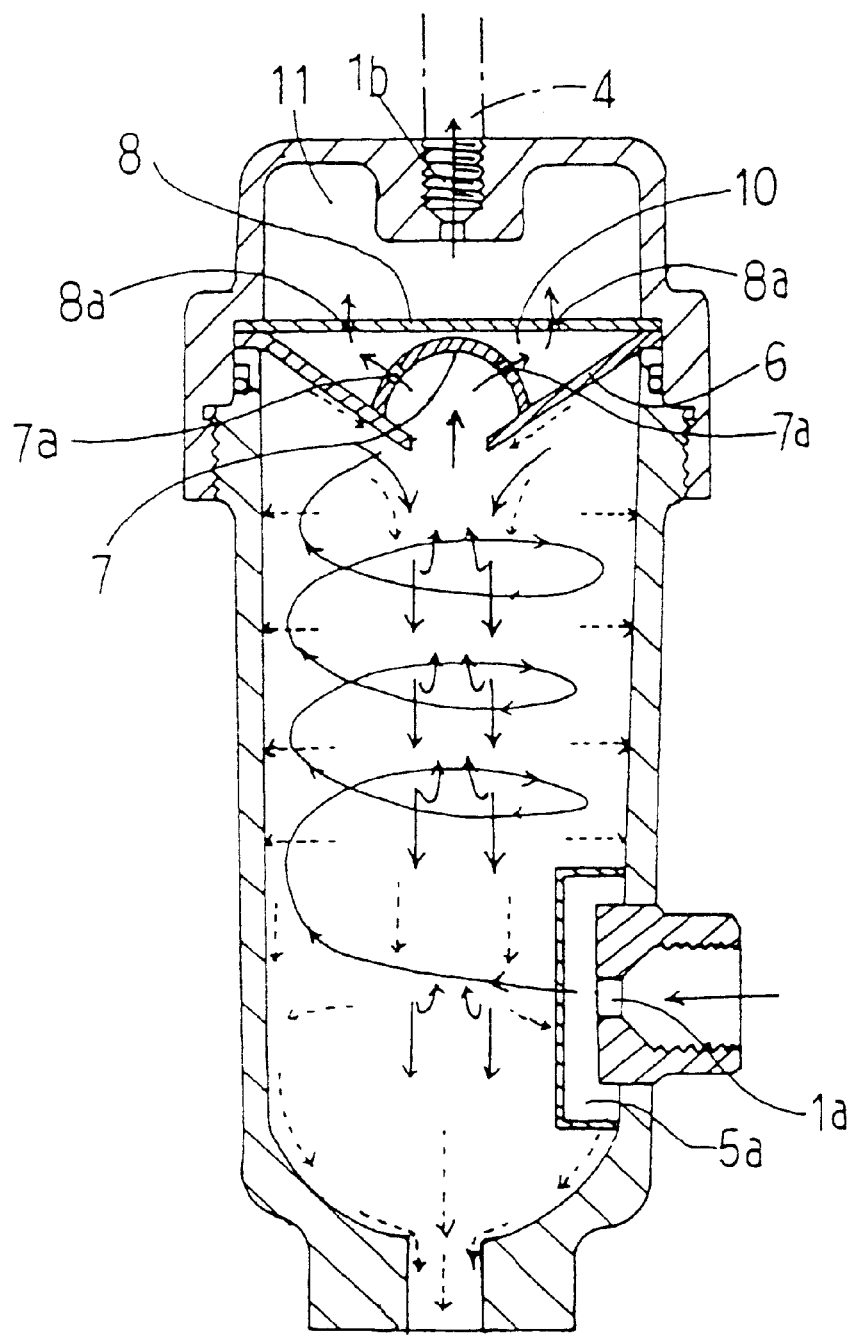
FIG. 8 is an explanatory view of the gas-liquid separator shown in FIG. 1, which illustrates how introduced air is separated into a flow of air and water drops.

Features of the present invention will be described below in detail in conjunction with embodiments shown in the drawings. FIG. 1 is a front view of a gas-liquid separator of a first embodiment; FIG. 2 is a partly vertically sectional view of the gas-liquid separator shown in FIG. 1; FIG. 3 is a sectional view taken along the line A—A in FIG. 2; FIG. 4 is a plan view of a blow guide plate in the gas-liquid separator shown in FIG. 2; FIG. 5 is a side view of the blow guide plate; FIG. 6 is a sectional view taken along the line B—B in FIG. 4; FIG. 7 is a performance graph plotting a moisture removal rate of the gas-liquid separator shown in FIG. 1; and FIG. 8 is an explanatory view of the gas-liquid separator shown in FIG. 1, which illustrates how introduced air is separated into a flow of air and water drops.

Referring to FIGS. 1 to 5, the reference numeral 1 is a cylindrical container having an inner diameter of 70 mm, 1a is a high-pressure air introducing port having a diameter of 6 mm, 1b is an air discharging port having a diameter of 4 mm, 1c is a cover portion provided at the top of the cylindrical container, 2 is an auto-drain connected to the bottom of the cylindrical container 1, 3 is a high-pressure air supply pipe connected to the high-pressure air introducing port 1a, and 4 is a high-pressure air discharging pipe connected to the air discharging port 1b.

The reference numeral 5 is a blow guide plate forming a blow guide part, 5a is an air passing groove defined between an outer wall circumferential surface of the blow guide plate 5 and an inner wall surface of the cylindrical container 1. The air passing groove 5a has a curved shape following an inner wall surface of the cylindrical container 1. Air is released from a downstream end of the air passing groove 5a into the cylindrical container 1 near its inner wall surface so that the released air whirls along the inner wall surface of the cylindrical container 1 without colliding with the inner wall surface.

The reference numeral 5b is an attachment hole for the blow guide plate 5, 5c is an attachment bolt which is inserted into the attachment hole 5b, 6 is a conical receiving plate provided in an upper portion within the cylindrical container 1, and 6a is a central opening formed at the center of the conical receiving plate 6 and having a diameter of 12 mm.

Further, the reference numeral 7 is a dome as a curved member welded to an upper central surface of the conical receiving plate 6, 7a are two ventholes formed in the dome 7, each having a diameter of 3 mm, 8 is a partition, 8a are two ventholes formed in the partition 8, each having a diameter of 3 mm, 9 is a first small chamber, 10 is a second small chamber, and 11 is a third small chamber.

The operation of the gas-liquid separator of this embodiment will now be described. When high-pressure air containing moisture is blown from the high-pressure air introducing port 1a through the high-pressure air supply pipe 3, the air collides with a groove surface of the air passing groove 5a of the blow guide plate 5, thereby changing its direction by 90°. Then, the air advances along the inner wall surface of the cylindrical container 1 in the circumferential direction following the air passing groove 5a.

The distance between the high-pressure air introducing port 1a (the inner wall surface of the cylindrical container 1) and the groove surface of the air passing groove 5a, with which the blown air collides, is 5 mm. The air is thus steeply curved, and moisture in the air is partly separated by collision. After advancing through air passing groove 5a, the air is blown into the cylindrical container 1 from the downstream end of the air passing groove 5a, and then rises in the form of a spiral flow while whirling. Thus, since the air passing groove 5a defined between the outer circumferential surface of the blow guide plate 5 and the inner wall surface of the cylindrical container 1 is curved so as to follow the inner wall surface of the cylindrical container, the introduced air is efficiently separated into gas and a liquid by collision, and also energy loss caused upon change in the air direction is reduced. After rising until striking against the conical receiving plate 6, the spiral flow descends along a lower surface of the conical receiving plate 6 toward the center thereof.

FIG. 8 illustrates the above-described process in the cylindrical container 1. Water drops, being forced outward by centrifugal force caused by the whirling of the spiral flow, are put on the inner wall surface of the cylindrical container 1, and then run downward along the inner wall surface. Some water drops are separated from the air before contacting with the inner wall surface due to a difference in specific gravity and fall down to a bottom surface of the cylindrical container 1.

When the spiral flow strikes against the conical receiving plate 6, water drops are put on the lower surface of the conical receiving plate 6, and then run down along the lower surface thereof. After that, the water drops fall down by gravity from a peripheral edge of the central opening 6a to the bottom surface of the cylindrical container 1.

The air flow including the moisture strike against the conical receiving plate 6 and are carried downward together, the moisture is separated from the air to form water drops due to a difference in specific gravity, and falls down to the bottom surface of the cylindrical container 1. The fallen water drops are then recovered into the auto-drain 2.

On the other hand, the air in a central portion of the cylindrical container 1 gradually rises in a manner like being sucked from the above, and flows into the first small chamber 9 through the central opening 6a. The air flowing into the first small chamber 9 through the central opening 6a of the conical receiving plate 6 enters the second small chamber 10 through the ventholes 7a and then the third small chamber 11 through the ventholes 8a. The air is finally discharged to the air discharging pipe 4 through the air discharging port 1b in the third small chamber 11 after passing those small chambers.

To measure a dehumidifying capability of this embodiment, 100 cc of water mixed with color ink was mixed into flows of high-pressure air having different flow rates from 100 to 500 liter per minute at a rate of 30 cc/min, as shown in FIG. 7. The resulting high-pressure air was blown into the high-pressure air of 10 atmospheres through the high-pressure air supply pipe 3. A graph of FIG. 7 plots the amount of the inked water recovered through the auto-drain 2 under the above condition in relation to the air flow rate.

As seen from the graph of FIG. 7, almost 100% of the inked water was recovered for the flow rates up to 300 liter/min. The moisture removal rate was slightly lowered to a value near 99% at the flow rate of 500 liter/min. Since the water is colored with the ink, how the water is put on and remains in the cylindrical container can be apparently observed by removing the cover portion. An observation of the interior of the cylindrical container resulted in little colored portion, and any residue of moisture was not found. Further, substantially similar results were obtained when the high-pressure air was of 3 to 7 atmospheres. In other words, there was no change in performance depending on the pressure value.

Figure 9:
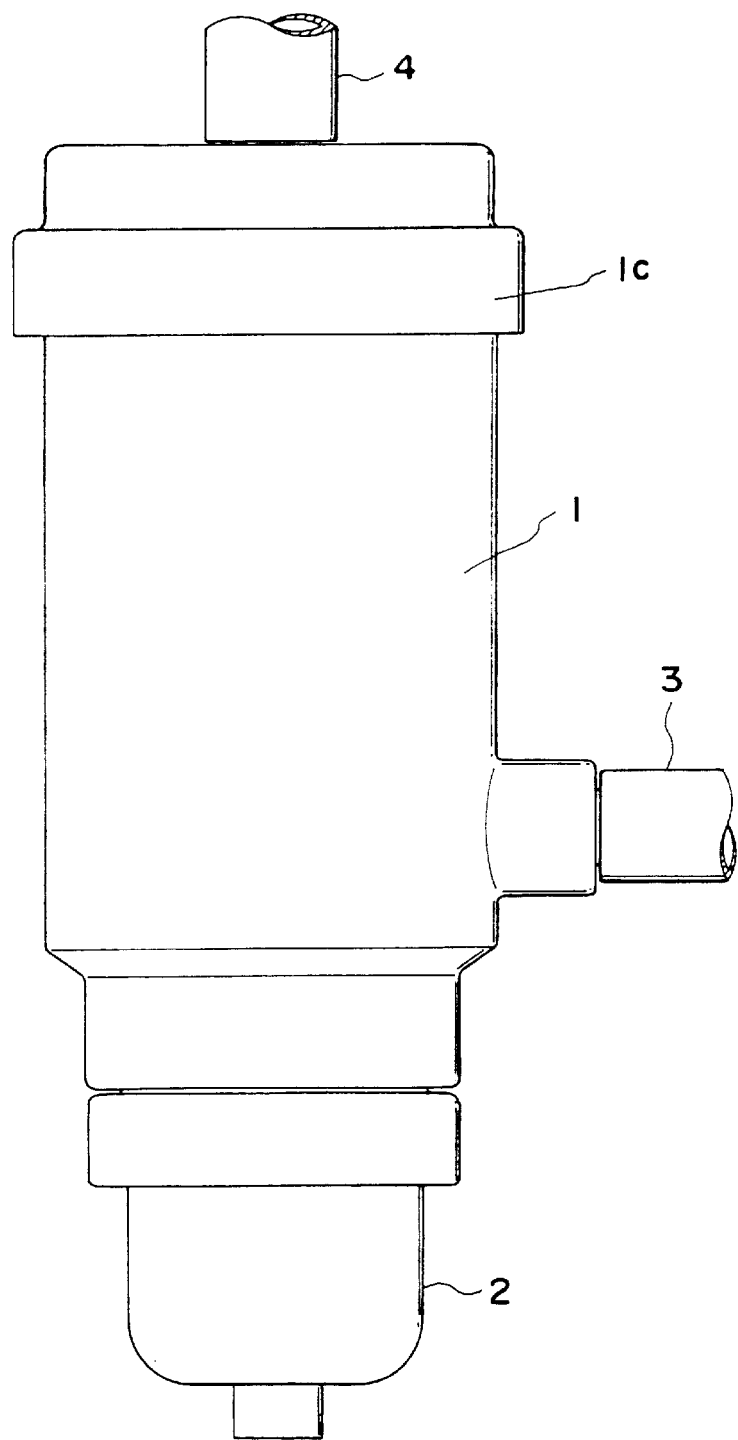
FIG. 9 is a front view of a gas-liquid separator of a second embodiment.
Figure 10:
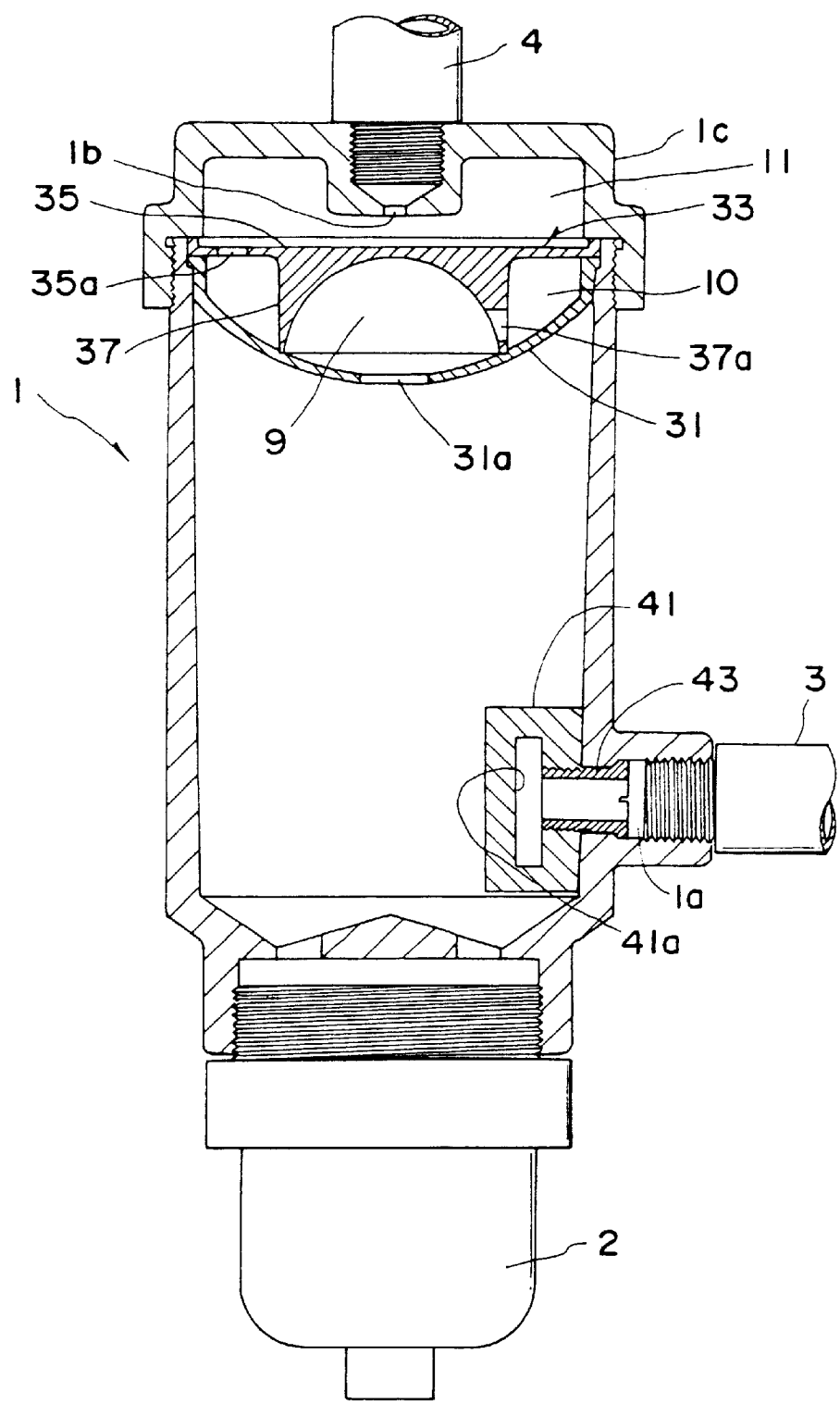
FIG. 10 is a vertical sectional view of the gas-liquid separator shown in FIG. 9.
Figure 11:
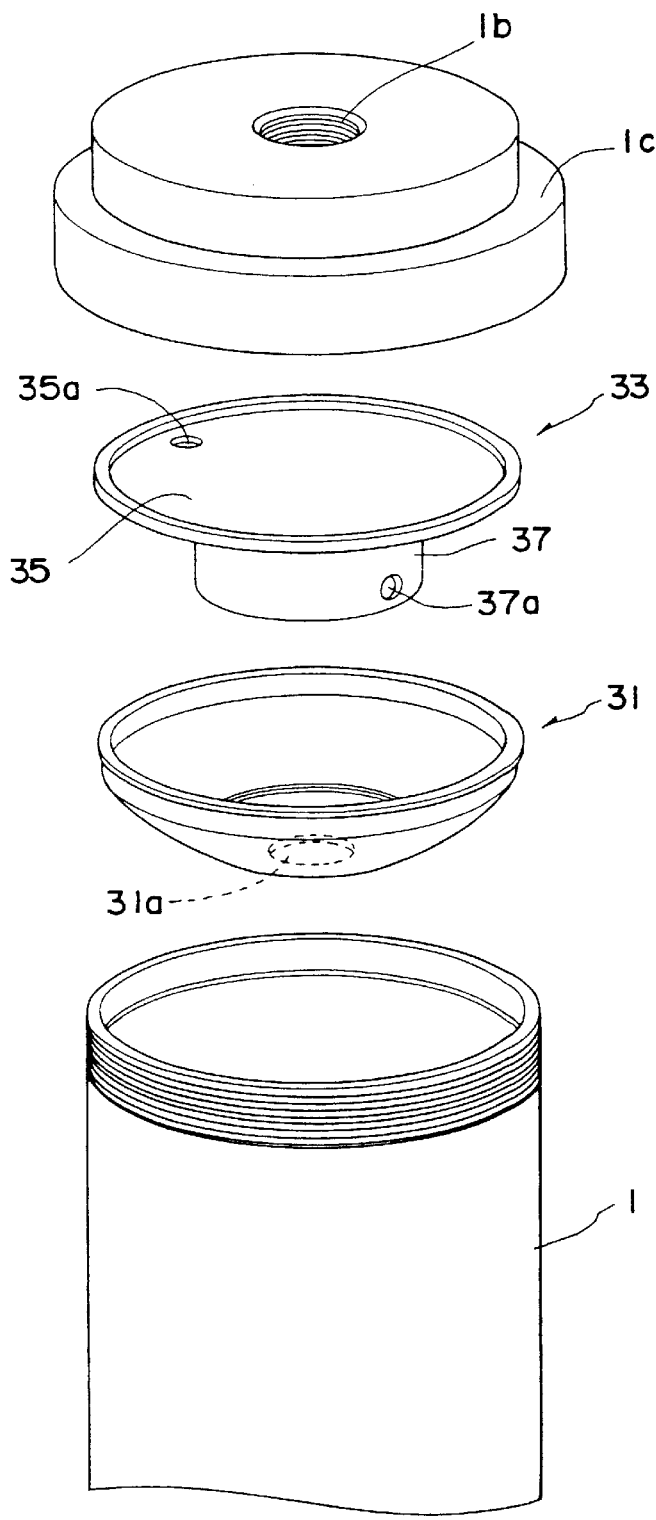
FIG. 11 is an exploded perspective view of an upper portion of the gas-liquid separator shown in FIG. 9.
Figure 12A:
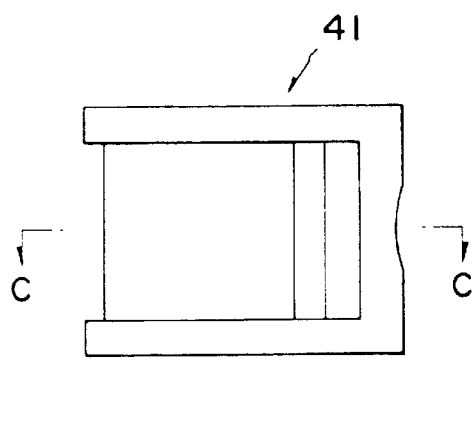
FIG. 12A is a front view of a member forming an collision surface and a guide part.
Figure 12B:
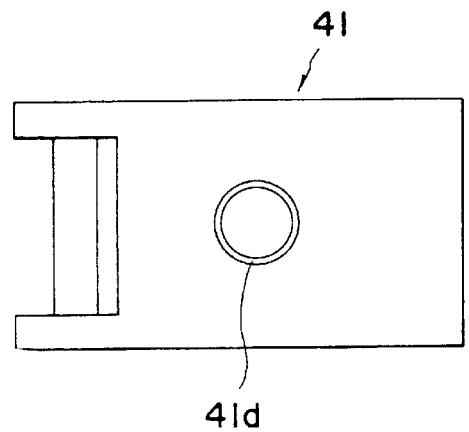
FIG. 12B is a side view of the member.
Figure 12C:
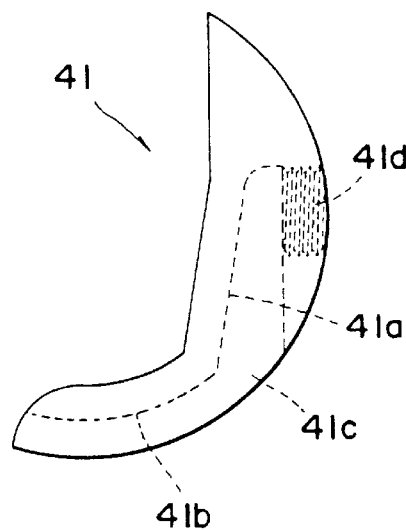
FIG. 12C is a plan view of the member.
Figure 12D:
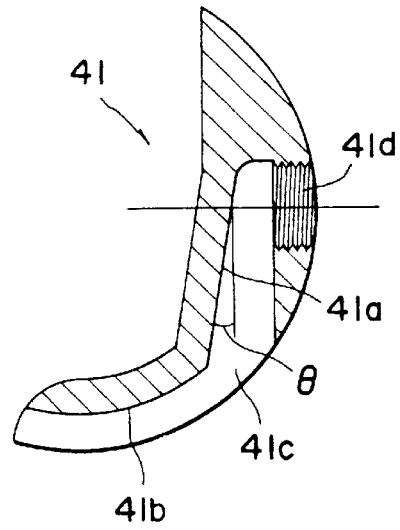
FIG. 12D is a sectional view taken along the line C—C in FIG. 12A.
Figure 13:
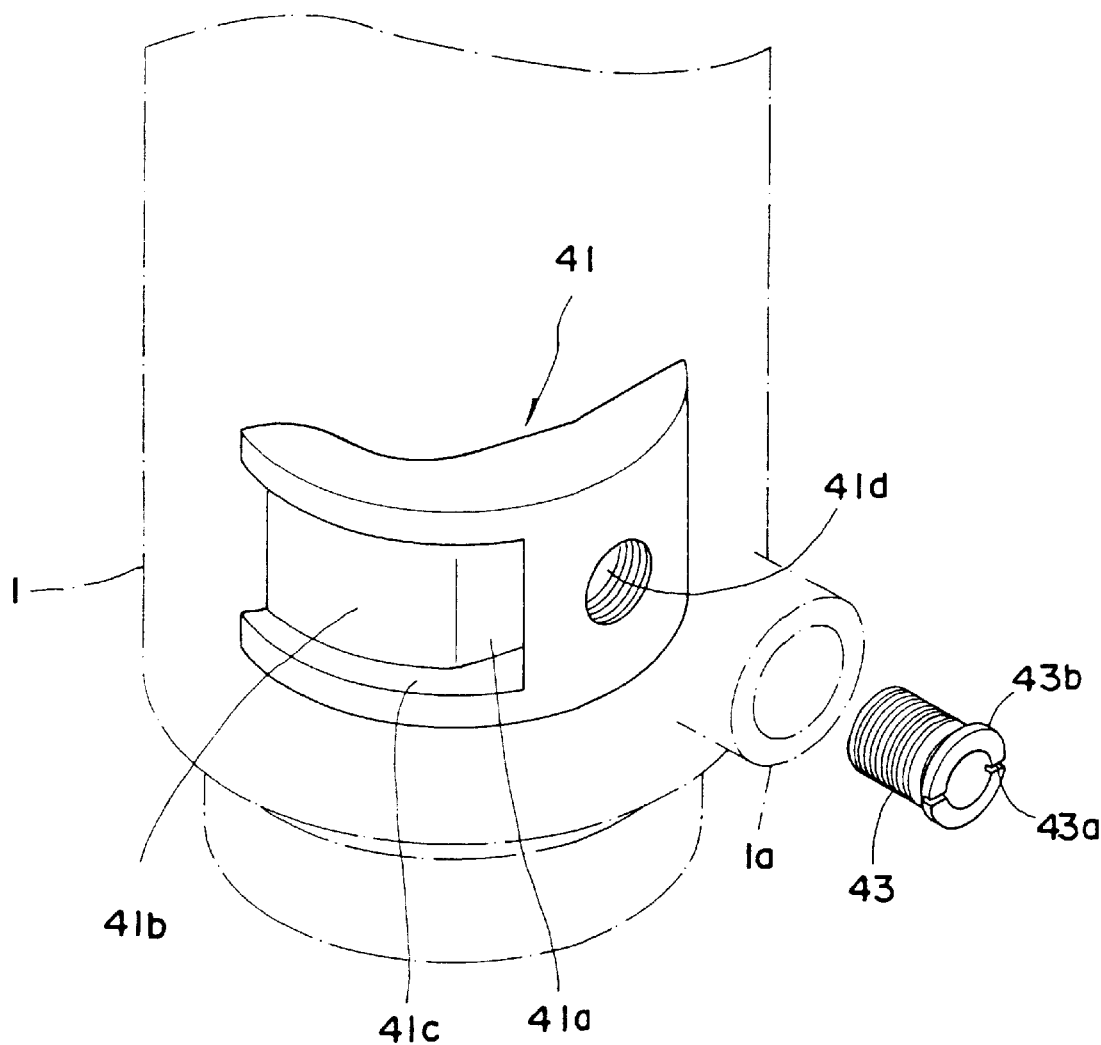
FIG. 13 is an exploded perspective view of the member forming the collision surface and the guide part, showing an assembled state of the members.
Figure 14:
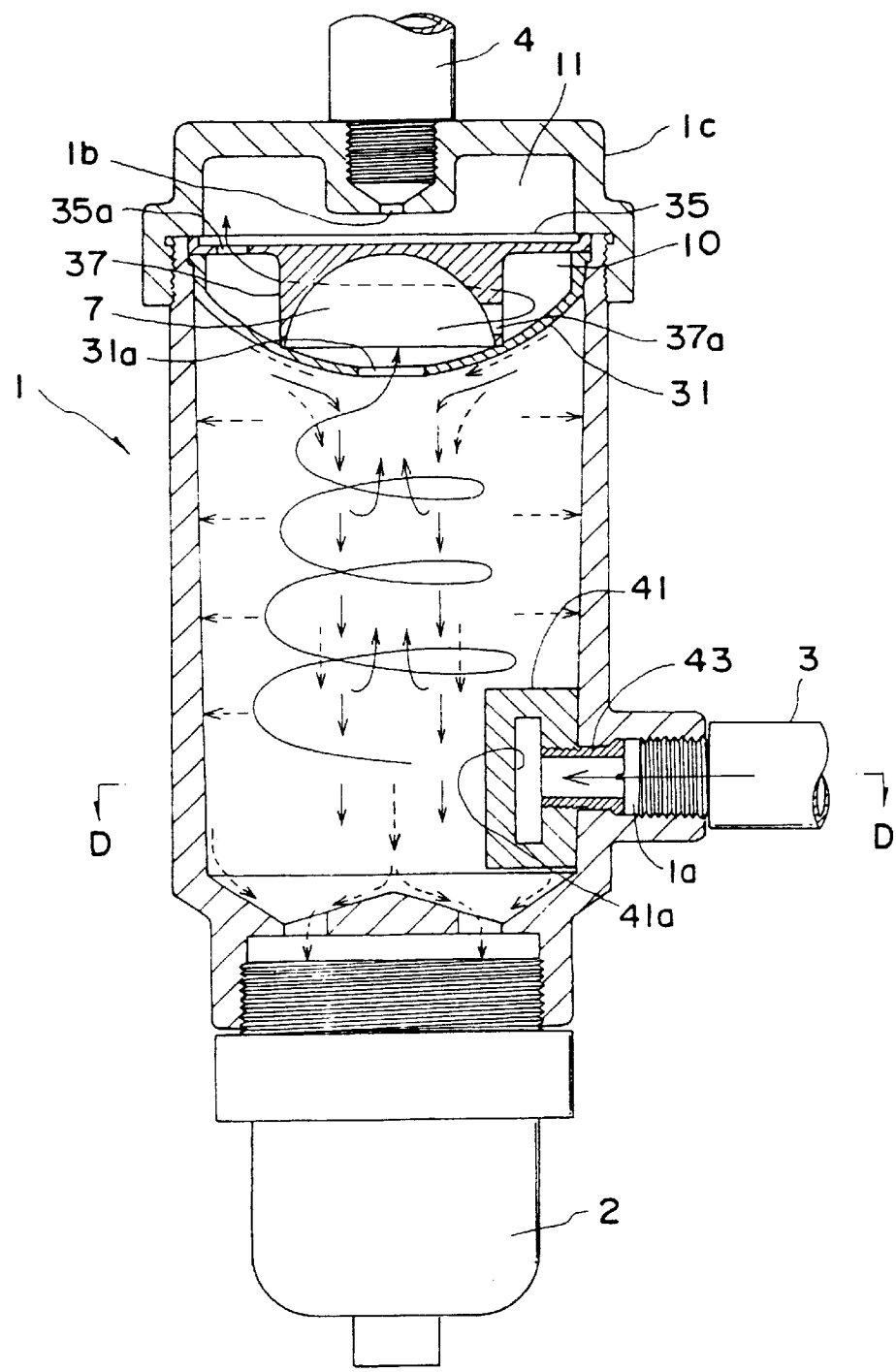
FIG. 14 is an explanatory view of the gas-liquid separator shown in FIG. 9, which illustrates flows of air and moisture.
Figure 15:
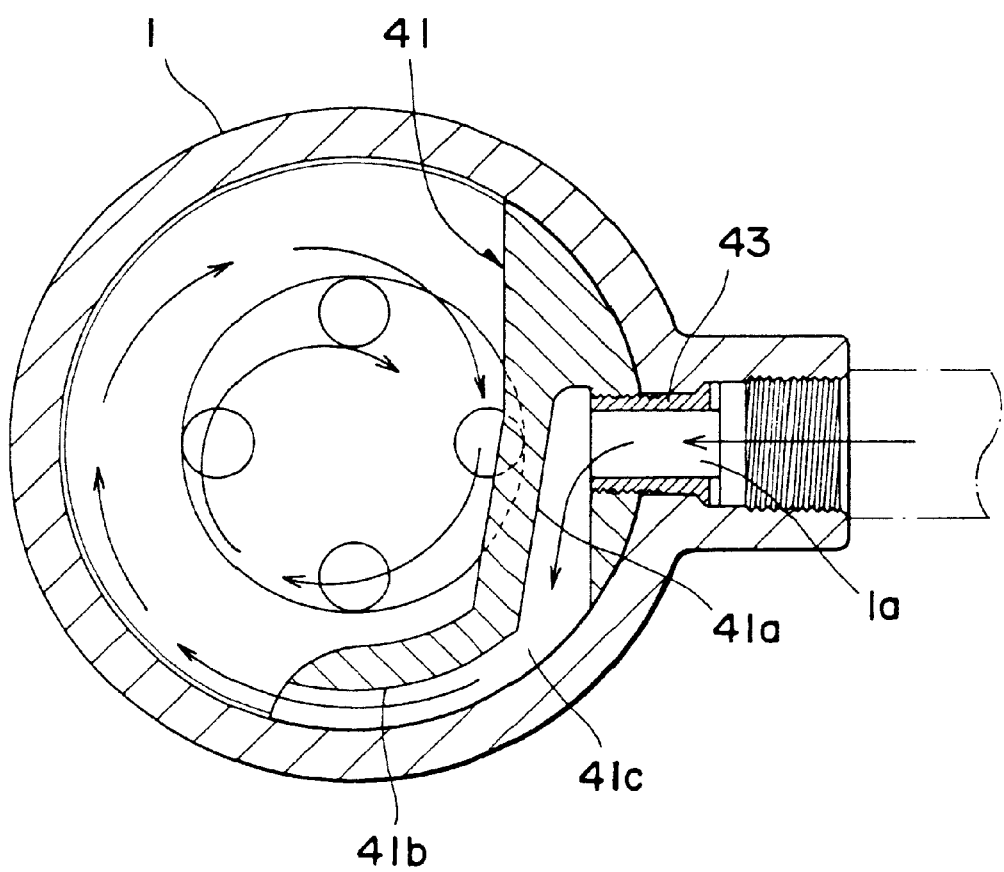
FIG. 15 is a sectional view taken along the line D—D in FIG. 14.

A second embodiment will now be described below. Components of a gas-liquid separator of this second embodiment corresponding to those of the gas-liquid separator of the first embodiment are denoted by the same reference numerals and are not explained here. FIG. 9 is a front view of the gas-liquid separator of the second embodiment; FIG. 10 is a vertical sectional view of the gas-liquid separator shown in FIG. 9; FIG. 11 is an exploded perspective view of an upper portion of the gas-liquid separator shown in FIG. 9; FIG. 12A is a front view of a member forming an collision surface and a guide part, FIG. 12B is a side view of the member, FIG. 12C is a plan view of the member, and FIG. 12D is a sectional view taken along the line C—C in FIG. 12A; FIG. 13 is an exploded perspective view of the member forming the collision surface and the guide part, showing an assembled state; FIG. 14 is an explanatory view of the gas-liquid separator shown in FIG. 9, which illustrates flows of air and moisture; and FIG. 15 is a sectional view taken along the line D—D in FIG. 14.

This second embodiment differs from the first embodiment primarily in the structural members which correspond to the blow guide plate 5, the conical receiving plate 6, the dome 7 and the partition 8.

First, a receiving plate 31 corresponding to the conical receiving plate 6 in the first embodiment will be described. In this second embodiment, the receiving plate 31 is formed to have a lower surface which has an arc-shaped sectional view, i.e., which constitutes part of a spherical surface. By providing such a curved lower surface rather than the linear lower surface as in the above embodiment, water drops contacted with the lower surface of the receiving plate 31, in particular, can more easily fall down.

Next, an intermediate member 33 which corresponds to the dome 7 and the partition 8 in the first embodiment will be described. In this second embodiment, a partition 35 having a circular form in a plan view and a curved member 37 suspended from the partition 35 are formed integrally with each other. Further, the partition 35 and the curved member 37 have ventholes 35a, 37a are formed therein, respectively, so as to locate in 180°—opposite positions around the center of the curved member 37. In this embodiment, since the partition 35 and the curved member 37 are formed integrally with each other, the positional relationship between the ventholes 35a and 37a is maintained.

With the above-described arrangement, that is, the venthole 35a formed in the partition 35 and the venthole 37a formed in the curved member 37 are arranged in 180°—opposite positions around the center of the curved member 37, the venthole 37a of the curved member 37 and the venthole 35a of the partition 35 can be apart from each other to the maximum, causing the air discharged through the venthole 37a of the curved member 37 to temporarily remain in a space defined by an outer surface of the curved member 37, a lower surface of the partition 35 and the inner wall surface of the cylindrical container 1. As a result, water drops can be effectively prevented from blowing out together with the air after the gas-liquid separation.

Then, a blow guide member 41 which corresponds to the blow guide plate 5 in the first embodiment will be described. As is clearly shown in FIGS. 12 and 13, the blow guide member 41 comprises a linear collision surface 41a and a guide part 41b continuously extending from the collision surface 41a. A space defined by the inner wall surface of the cylindrical container 1, the above-described collision surface 41a and the guide part 41b serves as an air passing groove 41c. In this embodiment, the collision surface 41a is formed to extend linearly and inclined 3° in a direction to widen the air flow passage from a plane perpendicular to the incoming direction of air (see "θ" in FIG. 12D).

Such an inclination of the collision surface contributes to not only increasing the efficiency of liquefaction of moisture by collision with the surface, i.e., separation into gas and liquid, but also reducing energy loss caused upon subsequent change in the flow direction of the incoming air.

Returning to FIGS. 12 and 13, the reference numeral 41d is an internal thread formed in the blow guide member 41, and 43 is an external thread which are able to mesh with the internal thread 41d. The external thread 43 has such an outer configuration as allowing its insertion into the high-pressure air introducing port 1a. Also, the external thread 43 is provided with a flange portion 43b formed at a head end thereof to serve as a bearing surface, and cut slots 43a formed in the flange portion 43b in a radial direction for fastening the screw.

The blow guide member 41 is placed in the cylindrical container 1 in a manner that the internal thread 41d is positioned to face the high-pressure air introducing port 1a, and the external thread 43 is inserted through the high-pressure air introducing port 1a, and meshed and fastened with the internal thread 41d of the blow guide member 41, thereby fixing the blow guide member 41. Accordingly, in this embodiment, the blow guide member 41 can be attached from the side of the high-pressure air introducing port 1a. This structure effectively prevents air from leaking through gaps around the attachment bolts 5c inserted through the attachment holes 5b, and hence air-tightness of the cylindrical container 1 can be maintained.

Thus, the gas-liquid separator of the second embodiment of the present invention can provide the above-mentioned advantages in addition to the various functions of the first embodiment described above.

The following advantages can be achieved with the present invention.

(1) The removal rate of a liquid component can be increased to nearly 100% even for air introduced under high pressure with a simple structure including no movable parts and requiring no power.

(2) With the feature that a collision surface is curved to follow an inner wall surface of a cylindrical container or is inclined to widen a flow passage toward the downstream side, liquefaction of moisture by collision with the surface, i.e., separation into gas and liquid, is efficiency performed, and energy loss caused upon subsequent change in the flow direction of the incoming gas is reduced. As a result, the gas-liquid separation can be achieved with high efficiency.

(3) With the feature that a curved member having a venthole which is disposed at the position between a conical receiving plate and a partition, and over a central opening of the conical receiving plate, provides a small chamber, the liquid component which has not been recovered by the conical receiving plate is captured by an inner surface of the curved member and turned into droplets. The droplets fall down to a bottom surface of the cylindrical container through the central opening of the conical receiving plate and then recovered through a drain.

(4) With the feature that a venthole of the partition and the venthole of the curved member are arranged in 180°—opposite positions around the center of the curved member, the venthole of the curved member and the venthole of the partition can be apart from each other to the maximum, causing the gas discharged through the venthole of the curved member to temporarily remain in a space defined by an outer surface of the curved member, a lower surface of the partition and an inner surface of the cylindrical container. As a result, the liquid can be effectively prevented from blowing out together with the gas after the gas-liquid separation.

(5) With the feature that the curved member and the partition are formed integrally with each other, the positional relationship between the ventholes formed in the curved member and the partition, respectively, can be securely maintained.

(6) With the feature that the distance between a gas inlet port and the collision surface is set to be in a range of 3–15 mm, pressure loss can be limited at a lower level while ensuring the gas-liquid separation by collision.

(7) With the feature that the gas inlet port is provided with a throttle portion for increasing a gas flow speed, it is possible to enhance the gas-liquid separation effect by collision and, further, to effectively carry out the gas-liquid separation by centrifugal force in the subsequent process.

(8) With the feature that the collision surface and a guide part both provided in the cylindrical container are integrally formed, and an attaching/detaching mechanism to attach and detach the integral member through the gas inlet port is provided, it is possible to maintain air-tightness of the cylindrical container and to enhance the gas-liquid separation effect.

INDUSTRIAL APPLICABILITY

The present invention can be suitably employed to dehumidify air which is supplied to, for example, air-operated machines such as air motors and air breakers, air blowing apparatus for blowing away powdery dust, and air blowing apparatus for drying and cooling.

What is claimed is:

1. A gas-liquid separator comprising a gas inlet port provided in the side surface of a cylindrical container having a hollow chamber formed therein, a discharging port for discharging gas after gas-liquid separation provided at the top of the cylindrical container, a collision surface with which gas supplied from the gas inlet port collides and a guide part for changing a flow direction of the gas after collision so as to flow along an inner wall surface of the cylindrical container in a circumferential direction provided in the cylindrical container at a position to face the gas inlet port, a receiving plate having a substantially conical shape with an opening formed at a center thereof provided in an upper portion of the hollow chamber with a projecting central portion facing downwardly to divide the hollow chamber into upper and lower hollow chambers, the upper hollow chamber being partitioned by the receiving plate and communicating with the discharging port, a partition having at least one venthole and dividing the upper hollow chamber disposed above the receiving plate in opposed relation, said collision surface being curved to follow an inner wall surface of the cylindrical container or inclined so as to widen a flow passage toward the downstream side, a curved member having at least one venthole disposed at a position between said receiving plate and said partition and disposed over the opening of said receiving plate, and a small chamber formed between said curved member and an upper surface of said receiving plate.

2. A gas-liquid separator as defined in claim 1, wherein the venthole of said partition and the venthole of said curved member are arranged in 180°—opposite positions around a center of the curved member.

3. A gas-liquid separator as defined in claim 2, wherein said curved member and said partition are formed integrally with each other.

* * * * *